Sept. 14, 1965 R. E. HUPPERT 3,206,555

APPARATUS FOR THE AUTOMATIC REPRODUCTION OF TAPE RECORDINGS

Filed March 6, 1961 2 Sheets-Sheet 1

INVENTOR
Roger E. Huppert

BY
Stevens, Davis, Miller & Mosher
ATTORNEYS

Sept. 14, 1965 R. E. HUPPERT 3,206,555

APPARATUS FOR THE AUTOMATIC REPRODUCTION OF TAPE RECORDINGS

Filed March 6, 1961 2 Sheets-Sheet 2

INVENTOR
Roger E. Huppert

BY Stevens, Davis, Miller & Mosher
ATTORNEYS

United States Patent Office 3,206,555
Patented Sept. 14, 1965

3,206,555

APPARATUS FOR THE AUTOMATIC REPRODUCTION OF TAPE RECORDINGS

Roger Emil Huppert, 44 Weimarerstrasse,
Vienna 18, Austria

Filed Mar. 6, 1961, Ser. No. 93,726
Claims priority, application Austria, Mar. 5, 1960,
1,740/60
5 Claims. (Cl. 179—100.1)

Figure 1:
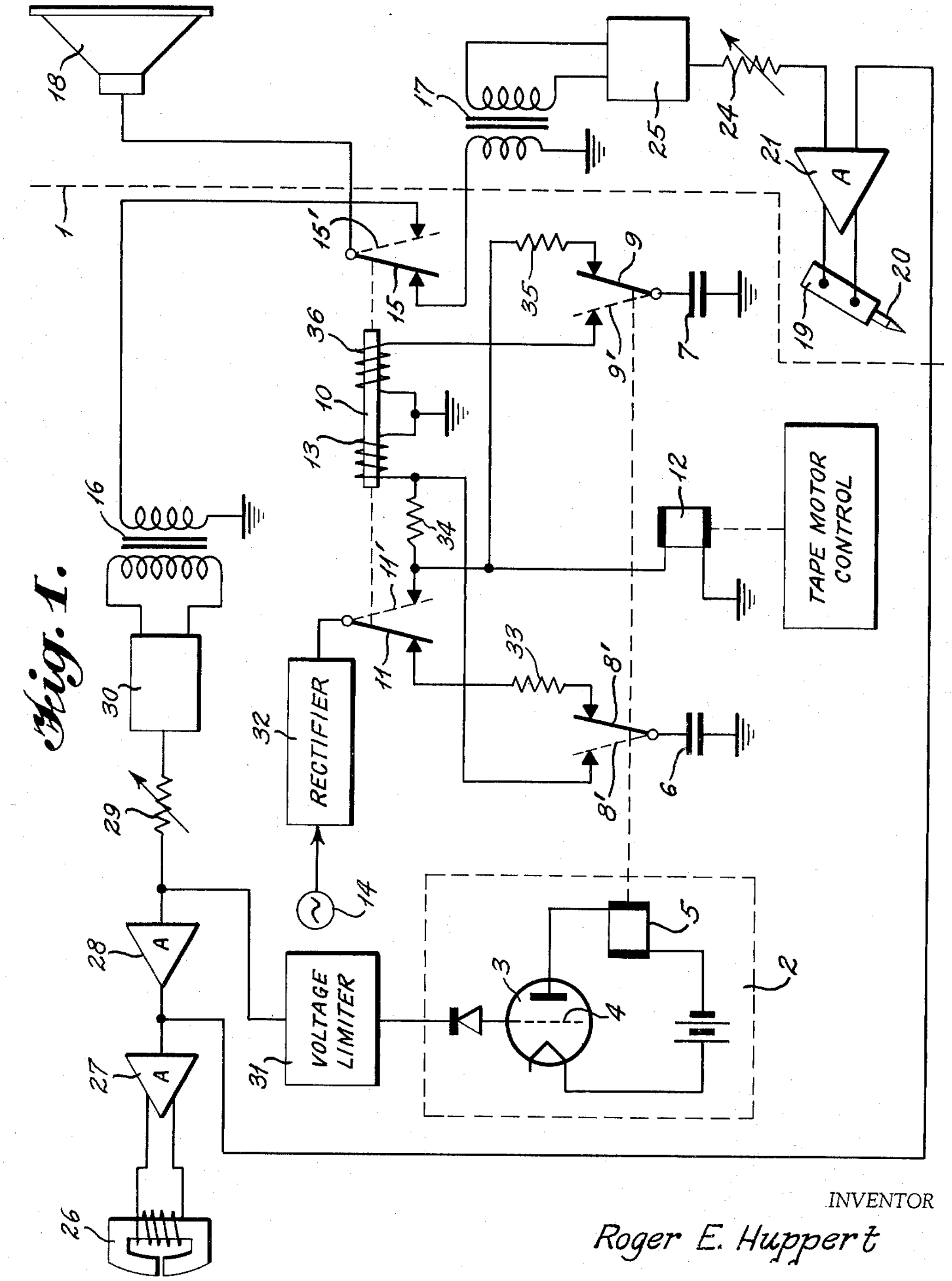

This invention is based on the conception of providing at least two sound reproducing devices, and utilising them in such manner that alternating uses of the devices is made possible. The invention is applied specifically to apparatus for use in reproduction of, say, tape recordings in the intervals between the reproductions from a juke-box or other sound recording and reproducing device of the disc type.

A special advantage of one preferred form of the invention lies in the fact that an advertising slogan, which is recorded on a tape, can be started immediately at the beginning of the record change interval of the juke-box. In the absence of any delays then, the full 10–15 seconds of the interval can be used for advertising. A further advantage of this form of the invention lies in the fact that the beginning of the advertising slogan always comes promptly after the end of the playing of a record and is not influenced by any strong background noises in the room, where the juke-box is standing.

Broadly, the present invention provides a method for controlling alternate operation of at least two electrically operated reproducing devices, which method consists in having an electrically actuated apparatus comprising in combination first and second sound reproducing devices, a vibratory member included in at least the first of the devices and arranged, in operation, to generate an output voltage. An electrical circuit controlled by that voltage to provide for storage of energy from a source of electrical energy. The circuit has means to release that energy upon cessation of operation of the vibratory member, and an electrical circuit through which the energy thus released is caused to put into action the second sound reproducing device.

The entire apparatus is an electrically operated device comprising, in combination a jukebox, a tape reproducer, a current supply source, output connections from the jukebox and the tape reproducer, a motor for the tape reproducer, a loudspeaker, an electron tube having a grid, which grid together with one output terminal of the juke-box is connected to an output line of the tape reproducer, a first relay having two armatures, a differential relay, and electrical connections such that current from the source is conducted through an armature of the differential relay, through one armature of the first relay to a condenser associated with the first armature, and the first relay, when energized, operates the differential relay to direct current to the motor of the tape reproducer and also change the connection of the loudspeaker from the juke-box output circuit to that of the tape reproducer.

In one arrangement according to the invention the full unregulated output voltage from the amplifier of the pre-amplifier stage of a jukebox or record reproducer (which is fitted with a muting switch) is amplified, rectified and supplied to a control unit. Under the influence of that output voltage, the control unit will connect the output transformer of the record reproducer with a loudspeaker, and hold a tape reproducer disconnected. When the output voltage is greatly reduced or completely lost, as is the case when the stylus in the tone arm of the record reproducer leaves the record groove, the control unit will start the tape apparatus and connect it to the loud-speaker in place of the record reproducer. The utilization of the said output voltage and the special amplification of it for purposes of control, has the following advantage: The smallest voltage produced by the stylus dragging in the groove of a record, is fully utilized for the desired purpose and the change over to tape reproduction of, for instance, an advertising announcement, occurs only, and then immediately, when the stylus is lifted from the record groove by the record changing mechanism of the jukebox. This is important because in the case of long-playing records there are intervals of several seconds between pieces of music, recorded on the same disc. The tape reproducer is not actuated by these intervals due to these special measures. The same applies for pauses, of possibly several seconds in the performance of various recorded compositions. By utilization of the mentioned output voltage, a disadvantage is prevented, which might occur if only voltages produced by the music tones are used for the control. In the latter case, in order to prevent with certainty the injection of undesired tape recordings, for example during a pause in a piece of music, an additional feature is required which will cause a delay before switching on the tape reproducer, according to the particular piece of music. This delay in the switching over would necessarily also occur during the record change interval of the jukebox and would cut the available time for the desired advertising slogan by about 7–8 seconds i.e. would cut it by more than half. This cut is so considerable, that it would make the carrying out of the process nearly uneconomical.

However, by utilizing the output voltage in accordance with the present invention such a high sensitivity of control is achieved, that during the mentioned pauses between, or in pieces of music the stylus hiss voltages in the tone groove or respectively the absence of such, will suffice for the reliability and safety of control. The safe stoppage of the mentioned stylus hiss voltages is in addition safeguarded by a muting switch arranged in the jukebox. This muting switch cuts off the amplifier of the jukebox when the record reproduction is complete and prevents interference voltages caused by the record change mechanism during disc change, from getting in to the loudspeaker. In a modification of the apparatus, the amplification of the output voltage of the record reproducer is used for the control by means of the amplifier in the tape apparatus. This special arrangement has the advantage that in its application it offers a specially simple and suitable switching of the apparatus for the execution of the process, as will be further explained. In a further modification the apparatus can be operated in such a way that the two sound reproducers and the control unit can be jointly switched on or off by the required current supply where the switching is preferably carried out by a switching device on the record reproducer. This form of application has the advantage that no special attention to the apparatus is required during shut down periods when the process is not carried out.

The invention, according to one modification thereof provides an apparatus in which the tape reproducer and the control unit are combined into a single unit fitted to an existing record reproducer with automatic record changer at a point between the output transformer and the loudspeaker also connected by means of a suitable intermediate socket to the amplifier tube of the pre-amplifier stage.

Figure 2:
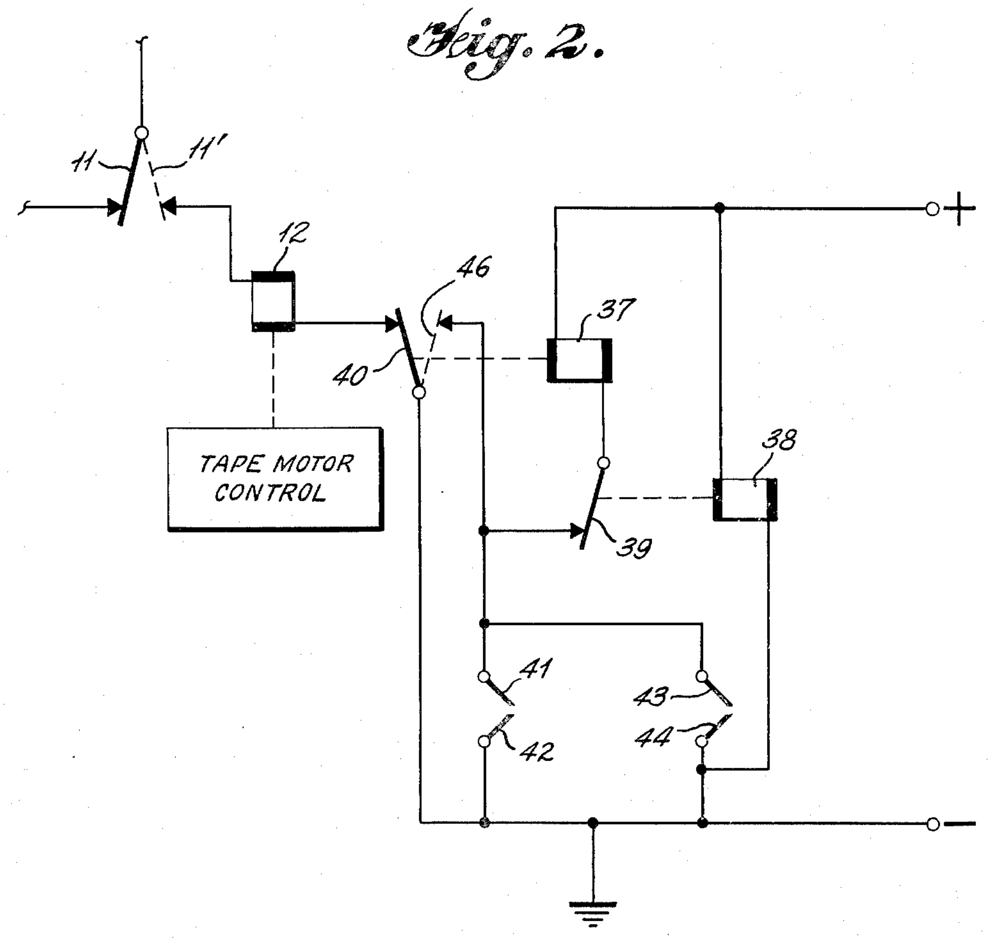

In order that the invention may be more clearly understood two preferred embodiments will now be described with the aid of the accompanying diagrammatic drawings in which:

FIGURE 1 is a diagram of electrical connections of one form in which a dashed line 1 has been drawn to indicate an advantageous separation between a record reproducer or jukebox and the additional apparatus comprising a control unit and a tape-recorder according to the invention, and FIGURE 2 indicates a variant of the arrangement shown in FIGURE 1.

The apparatus consists mainly of: a switching stage 2 with an electron tube 3 the grid of which carries the output voltage of the record reproducer. A relay 5 (controlled by tube 3) has two armatures (shown in their rest positions 8 and 9) which are connected through condensers 6 and 7 to ground. In the rest positions shown in full lines an armature 11 of a differential relay 10 connects condenser 6 through armature 8 to a current source 14. When relay 5 is energized armatures 8 and 9 are moved to positions 8′ and 9′ and the differential relay 10 is operated to move armature 11 to position 11′, thereby connecting a solenoid relay 12, associated with a tape motor to relay winding 13 of relay 10.

The second armature of the differential relay 10 is actuated to the energized position 15′ to connect the output transformer 16 of the tape reproducer—and in the rest position 15 the output transformer 17 of the record reproducer—with the loudspeaker 18.

The drawing indicates not only the electrical system of the record reproducer but also the tone arm 19 with stylus 20, the pre-amplifier stage 21 for the supply of the full, unregulated output voltage from the amplifier, the volume control 24, and the end stage 25.

Belonging to the tape reproducer there are shown diagrammatically the tape head 26, the pre-ampifier stage 27, the amplifier stage 28, volume control 29 and the end stage 30.

Belonging to the control unit there are shown a usual voltage limiting device 31, a rectifier 32 and resistances 33, 34 and 35. The method of operation of the apparatus is as follows: Insertion of a coin into the jukebox puts it into operation. At first the hiss of the stylus 20 (of the tone arm 19) produces a voltage in the pre-amplifier 21. This voltage is amplified in the amplifier stage 28 of the tape reproducer and passed to a voltage limiting stage 31, which reduces all incoming voltages to a uniform control voltage (in a generally known way). The magnitude of this is such, that when it is rectified in electron tube 2 and applied to grid 4 of control valve 3, it blocks the anode circuit reliably and thus leaves the armatures of the relay 5 (which lies in this anode circuit) in their rest positions 8 and 9 respectively. With the relay 5 in this position, the two armatures 11 and 15 of the differential relay 10, which also belongs to the control unit, are also in their rest position. Thus the output transformer 17 of the jukebox is connected to loudspeaker 18. This so until the record is played to the end and the disc changer of the jukebox lifts the stylus 20 from the groove of the record.

During the playing of the record, the condenser 6 is charged by current supply 14 through armature 8 (in rest position) of relay 5, a protective resistance 33, armature 11 (in rest position) of differential relay 10, and a current supply rectifier 32.

On lifting the stylus 20 from the groove of the disc, the output voltage at the preamplifier 21 breaks down and with that also the negative blocking voltage at grid 4 of the tube 3. The anode current of this tube now flows and pulls in the two armatures of the relay 5 into the energized position 8′ or 9′.

Condenser 6 discharges now through the winding 13 of the differential relay 10, thus the armatures are pulled in to the energized position 11′ or 15′. The first armature of this relay in its energized position is used as a "hold on" contact for winding 13 and closes the circuit of the solenoid relay 12 of the motor of the tape reproducer or respectively of the solenoid engaging forward tape feed in the same, so that the tape winds forward. The resistance 34 in the "hold on" circuit is of such value, that the current in the relay winding 13 is just sufficient to hold the first armature in its energized position 11′.

At the beginning of reproduction (e.g. an advertising slogan) from the tape head 26 through the pre-amplifier stage 27 and the amplifier stage 28 of the tape reproducer, a blocking voltage will occur at the grid 4 of the tube 3. The relay 5 becomes de-energized and its two armatures go to their rest positions 8 and 9 respectively. Condenser 7 is now being charged by current supply 14, through the second armature (in rest position 9) of the relay 5, the protective resistance 35 and the first armature 11′ (in energized position) of the differential relay 10, as well as the rectifier 32.

After the finish of the tape recording the output voltage of the tape reproducer diminishes so much that the negative blocking voltage at grid 4 of the tube 3 breaks down. The anode current of this tube flows now and the two armatures of the relay 5 go to the energized position 8′ or 9′. Condenser 7 discharges now through the winding 36 of the differential relay 10, which acts oppositely to winding 13 of this relay and overcomes the latter to move the two armatures of this relay to the rest position 11 or 15.

At the drop of the first armature of the differential relay 10 from its energized position 11′, the "hold on" contact is broken and thus not only the winding 13 is de-energized, but also the solenoid relay 12 of the motor of the tape reproducer stops, so that the tape comes to a standstill.

From the time of the ending of the tape recording until the setting down of the stylus on to the sound groove of the record to be played next, the loudspeaker is silent. As soon as the stylus 20 touches the sound groove however, the above detailed cycle starts anew and repeats itself in the above described manner.

The switching over of the loudspeaker 18 from jukebox to the tape reproducer is achieved by the second armature 15 of the differential relay 10.

It is also posible to suspend operation of the tape reproducer, if so desired. In this case the second armature of the differential relay 10 is constrained to remain in its rest position 15 and thus makes a permanent connection for the loudspeaker 18 with the amplifier 25 and the output transformer 17 of the jukebox.

The form of apparatus as shown in FIG. 2 permits, in addition, automatic re-winding of the tape on the tape reproducer; it consists of a combination of the solenoid relay 12 engaging tape feed in the tape reproducer motor with the relay 37, which is utilized to energize the tape rewind means (the armature of which relay, in its rest position 40 ensures the forward run of the tape and in its energised position acts as a "hold on" contact for the relay), or switch off relay 38 for the relay 37 and two pairs of brush contacts 41 and 42 and 43 and 44, respectively, for the switching foils on the tape; these foils are arranged in this case one on each tape side.

On reproducing the tape of the tape recorder the solenoid relay 12 carries current through the armature 40 (in rest position) of the relay 37. The re-winding of the tape occurs now automatically, as soon as the switching foil stuck on to the tape end initiates the rewind process with the help of switching contacts 41 and 42.

By this the armature of the relay 37 is brought into the energized position 46 and the circuit of the solenoid relay 12 is broken. By using the armature in its energized position 46 as a "hold on" contact, the rewind process continues, until brush pairs 43 and 44 touch a further switching foil at the beginning of the tape; this operates switch off relay 38 and its armature 39 opens the circuit to relay 37.

By arranging each one of the two mentioned switching foils on alternate sides of the tape, it is possible to prevent safely any mutual interference of the switching actions of the two contact pairs 41 and 42 or 43 and 44.

I claim:

1. An electrically operated apparatus comprising, in combination, a jukebox, a tape reproducer, a current supply source, output connections from said jukebox and said tape reproducer, a motor for said tape reproducer, a loudspeaker, an electron tube having a grid, which grid together with one output terminal of said jukebox is connected to an output line of said tape reproducer, first relay having two armatures, a differential relay, and electrical connections such that current from the source is conducted through an armature of said differential relay, through one armature of said first relay to a condenser associated with said one armature, and said first relay, when energized, operates the differential relay to direct current to the motor of the tape reproducer and also change the connection of the loudspeaker from the jukebox output circuit to that of the tape reproducer.

2. An electrically operated apparatus comprising, in combination, a jukebox, a tape reproducer, an electron tube having a grid, electrical connections between the output circuit of the tape reproducer and both the grid of the tube and the output circuit of the jukebox, first relay controlled by the tube and provided with two armatures each connected through condensers to earth, a differential relay having two windings and two armatures one of which latter is connected to a source of current supply, and electrical connections such that the last mentioned armature and one armature of said first relay serve together when in their rest positions to charge the condenser associated with differential armature and in their energized positions serve to supply current to one winding of the differential relay and thereafter to maintain the current supply thereto and also to supply current to the motor of the tape reproducer, the other armature of the differential relay is connected to the loudspeaker and the associated armature contacts are respectively connected to the output of the jukebox and the tape reproducer, and second armature of said one relay when in its energized position connects its associated condenser with the second of the two windings of the differential relay and in its rest position connects the same condenser to the current source through the armature of the differential relay that is connected to that source.

3. Electrically actuated apparatus comprising in combination first and second sound reproducing devices, a vibratory member included in at least the first of said members and arranged, in operation, to generate an output voltage, an electrical circuit controlled by that voltage to provide for a storage of energy from a source of electrical energy, means in said circuit to release that energy upon cessation of operation of said vibratory member, and an electrical circuit through which the energy thus released is caused to put into action the said second sound reproducing device.

4. Apparatus as claimed in claim 3 including a loud speaker used with the first sound reproducing device, and means serving to couple the second reproducing device to said loud speaker and arranged to be actuated by the released energy.

5. Apparatus as claimed in claim 3 in which there is a further means controlled by the second sound reproducing device for storage of energy while the second device is in operation, which energy is released upon cessation or sufficient diminishing of the output voltage of said device and operates to restore the circuits to a condition of readiness for sound reproduction from the first sound reproducing device to be recommenced when required.

References Cited by the Examiner

UNITED STATES PATENTS

| | | | |
|---|---|---|---|
| 2,214,482 | 9/40 | Schmidt | 179—100.1 |
| 2,960,577 | 11/60 | Pray et al. | 179—100.1 |

IRVING L. SRAGOW, *Primary Examiner.*

JOHN P. WILDMAN, *Examiner.*